(12) United States Patent
Mercuri

(10) Patent No.: US 6,517,964 B2
(45) Date of Patent: Feb. 11, 2003

(54) CATALYST SUPPORT MATERIAL FOR FUEL CELL

(75) Inventor: Robert Angelo Mercuri, Seven Hills, OH (US)

(73) Assignee: Graftech Inc., Lakewood, OH (US)

( * ) Notice: Subject to any disclaimer, the term of this patent is extended or adjusted under 35 U.S.C. 154(b) by 114 days.

(21) Appl. No.: 09/728,063

(22) Filed: Nov. 30, 2000

(65) Prior Publication Data

US 2002/0094471 A1 Jul. 18, 2002

(51) Int. Cl.⁷ ................................................ H01M 8/10
(52) U.S. Cl. .......................... 429/30; 429/40; 429/42; 429/44
(58) Field of Search .............................. 429/30, 40, 42, 429/44

(56) References Cited

U.S. PATENT DOCUMENTS

| | | | |
|---|---|---|---|
| 3,404,061 A | 10/1968 | Shane et al. ................. 161/125 |
| 4,285,799 A | * 8/1981 | de Nora et al. ........... 204/290.09 |
| 4,895,713 A | 1/1990 | Greinke et al. .............. 423/448 |
| 4,988,583 A | 1/1991 | Watkins et al. ............... 429/30 |
| 5,294,300 A | * 3/1994 | Kusuyama ................ 162/157.3 |
| 5,300,370 A | 4/1994 | Washington et al. .......... 429/34 |
| 5,773,480 A | 6/1998 | Stone et al. ................... 521/27 |
| 5,834,523 A | 11/1998 | Stock et al. .................. 521/27 |
| 5,902,762 A | 5/1999 | Mercuri et al. ............... 501/99 |
| 6,087,034 A | * 7/2000 | Mercuri ....................... 429/44 |
| 6,254,993 B1 | * 7/2001 | Mercuri ...................... 423/448 |
| 6,287,694 B1 | * 9/2001 | Zaleski et al. .............. 423/448 |

OTHER PUBLICATIONS

Carbon as a Catalyst Support in Fuel Cells, in The Electrochmical Society, Inc., Proceedings vol. 84–5, Pp 221–237, Cleveland, Ohio 1983.
WO 95/16287, International Publ. Date: Jun. 15, 19905, International Appln. No. PCT/CA94/00673, International Filing Date: Dec. 9, 1994.

* cited by examiner

Primary Examiner—Carol Chaney
Assistant Examiner—Dah-Wei D. Yuan
(74) Attorney, Agent, or Firm—James R. Cartiglia

(57) ABSTRACT

A catalyst support material useful in a membrane electrode assembly is presented. The support catalyst material is elongate electrically anisotropic particles of flexible graphite, and the membrane electrode assembly includes a pair of electrodes, an ion exchange membrane having opposed surfaces positioned between the electrodes and a catalyst material on the inventive support, at least a portion of an opposed surface of the ion exchange membrane being adjacent the catalyst which is supported on the elongate electrically anisotropic particles of flexible graphite sheet.

5 Claims, 5 Drawing Sheets

CATALYST SUPPORT MATERIAL FOR FUEL CELL

DESCRIPTION

1. Technical Field

This invention relates a catalyst support material useful in an electrode assembly for an electrochemical fuel cell that also includes an ion exchange membrane and at least one (and most commonly two) electrode, sometimes referred to as a gas diffusion layer. The electrode assembly comprises a catalyst material, typically platinum or a platinum group metal, which is present on a catalyst support material that comprises elongate anisotropic particles of expanded graphite.

1. Background of the Invention

An ion exchange membrane fuel cell, more specifically a proton exchange membrane (PEM) fuel cell, produces electricity through the chemical reaction of hydrogen with oxygen in the air. Within the fuel cell, electrodes denoted as anode and cathode surround a polymer electrolyte. A catalyst material stimulates hydrogen molecules to split into hydrogen atoms and then, at the membrane, the atoms each split into a proton and an electron. The electrons are utilized as electrical energy. The protons migrate through the electrolyte and combine with oxygen and electrons to form water.

A PEM fuel cell is advantageously formed of a membrane electrode assembly sandwiched between two graphite flow field plates. Conventionally, the membrane electrode assembly consists of random-oriented carbon fiber paper electrodes (anode and cathode) with a thin layer of a catalyst like platinum or a platinum group metal coated on isotropic carbon particles, such as lamp black, bonded to either side of a proton exchange membrane disposed between the electrodes. In operation, hydrogen flows through channels in one of the flow field plates to the anode, where the catalyst promotes its separation into hydrogen atoms and thereafter into protons that pass through the membrane and electrons that flow through an external load. Air flows through the channels in the other flow field plate to the cathode, where the oxygen in the air is separated into oxygen atoms, which joins with the protons through the proton exchange membrane and the electrons through the circuit, and combine to form water. Since the membrane is an insulator, the electrons travel through an external circuit in which the electricity is utilized, and join with protons at the cathode. The air stream on the cathode side removes the water formed by combination of the hydrogen and oxygen. Combinations of such fuel cells are used in a fuel cell stack to provide the desired voltage.

One possible limiting factor to the more widespread use of PEM fuel cells is the cost of the catalyst material and the relatively high resistivity of the isotropic carbon support material. In conventional fuel cells, the catalyst material is bonded to the PEM or the electrodes in a nonselective manner. That is, the catalyst material is distributed relatively uniformly on the opposed surfaces of the PEM, with result that catalyst deployment is not as efficient as possible.

Unlike the carbon materials conventionally used as a catalyst support material, graphites are made up of layer planes of hexagonal arrays or networks of carbon atoms. These layer planes of hexagonally arranged carbon atoms are substantially flat and are oriented or ordered so as to be substantially parallel and equidistant to one another. The substantially flat, parallel equidistant sheets or layers of carbon atoms, usually referred to as basal planes, are linked or bonded together and groups thereof are arranged in crystallites. Highly ordered graphites consist of crystallites of considerable size: the crystallites being highly aligned or oriented with respect to each other and having well ordered carbon layers. In other words, highly ordered graphites have a high degree of preferred crystallite orientation. It should be noted that graphite exhibits anisotropy because of its inherent structure and thus exhibit or possess many properties that are highly directional e.g. thermal and electrical conductivity and fluid diffusion.

Briefly, graphites may be characterized as laminated structures of carbon, that is, structures consisting of superposed layers or laminae of carbon atoms joined together by weak van der Waals forces. In considering the graphite structure, two axes or directions are usually noted, to wit, the "c" axis or direction and the "a" axes or directions. For simplicity, the "c" axis or direction may be considered as the direction perpendicular to the carbon layers. The "a" axes or directions may be considered as the directions parallel to the carbon layers or the directions perpendicular to the "c" direction. The graphites suitable for manufacturing expanded graphite possess a very high degree of orientation.

As noted above, the bonding forces holding the parallel layers of carbon atoms together are only weak van der Waals forces. Graphites such as Kish graphite and highly oriented pyrolytic graphite, but especially natural graphite, can be treated so that the spacing between the superposed carbon layers or laminae can be appreciably opened up so as to provide a marked expansion in the direction perpendicular to the layers, that is, in the "c" direction and thus form an expanded or intumesced graphite structure in which the laminar character of the carbon layers is substantially retained.

Graphite flake which has been greatly expanded and more particularly expanded so as to have a final thickness or "c" direction dimension which is as much as about 80 or more times the original "c" direction dimension can be formed without the use of a binder into cohesive or integrated flexible graphite sheets of expanded graphite, e.g. webs, papers, strips, tapes, or the like. The formation of graphite particles which have been expanded to have a final thickness or "c" dimension which is at least about 80 times the original "c" direction dimension into integrated flexible sheets by compression, without the use of any binding material is believed to be possible due to the excellent mechanical interlocking, or cohesion which is achieved between the voluminously expanded graphite particles.

In addition to flexibility, the sheet material, as noted above, has also been found to possess a high degree of anisotropy with respect to thermal and electrical conductivity and fluid diffusion, comparable to the natural graphite starting material due to orientation of the expanded graphite particles substantially parallel to the opposed faces of the sheet resulting from compression, e.g. roll pressing. Sheet material thus produced has excellent flexibility, good strength and a very high degree of orientation.

Briefly, the process of producing flexible, binderless anisotropic graphite sheet material, e.g. sheet, web, paper, strip, tape, foil, mat, or the like, comprises compressing or compacting expanded graphite under a predetermined load and in the absence of a binder. The expanded graphite particles, which generally are worm-like or vermiform in appearance, once compressed, will maintain the compression set and alignment with the opposed major surfaces of the sheet. The density and thickness of the sheet material can be varied by controlling the degree of compression. The density of the sheet material can be within the range of from about 0.08 grams per cubic centimeter (g/cc) to about 2.0 g/cc.

The flexible graphite sheet material exhibits an appreciable degree of anisotropy due to the alignment of graphite particles parallel to the major opposed, parallel surfaces of the sheet, with the degree of anisotropy increasing upon roll pressing of the sheet material to increased density. In roll pressed anisotropic sheet material, the thickness, i.e. the direction perpendicular to the opposed, parallel sheet surfaces comprises the "c" direction and the directions ranging along the length and width, i.e. along or parallel to the opposed, major surfaces comprises the "a" directions and the thermal, electrical and fluid diffusion properties of the sheet are very different, by orders of magnitude, for the "c" and "a" directions.

When electrically anisotropic flexible graphite sheet material is shredded and milled to provide elongate particles sized predominantly about 2 to 50 microns in length, the particles are anisotropic with respect to electrical resistivity, with the resistivity along the length of the particles being very low compared with the resistivity transverse to its length, making the particles uniquely effective as a fluid cell catalyst support. In addition, the sheet-like nature of the elongate particles bring about better particle to particle connectivity, and hence better electrical conductivity, compared to more spherically shaped conventional carbons.

SUMMARY OF THE INVENTION

The present invention provides a catalyst support material useful in a membrane electrode assembly for an electrochemical fuel cell, the electrode assembly comprising a pair of electrodes and an ion exchange membrane having opposed surfaces positioned between the electrodes. The inventive catalyst support material is formed of elongate electrically anisotropic particles milled from flexible graphite sheet material, such as flexible graphite foil or mat.

In a preferred embodiment, at least one of the electrodes of the membrane electrode assembly is formed of a sheet of a compressed mass of expanded graphite particles having a plurality of transverse fluid channels passing through the sheet between first and second opposed surfaces of the sheet, one of the opposed surfaces of the sheet abutting an opposed surface of the ion exchange membrane. The transverse fluid channels are adjacently positioned and separated by walls of compressed expanded graphite. At least a portion of an opposed surface of the ion exchange membrane is in operative contact with a catalyst material that is supported on the inventive catalyst support formed of elongate electrically anisotropic particles milled from flexible graphite sheet material.

DETAILED DESCRIPTION OF THE DRAWINGS

Figure 1:
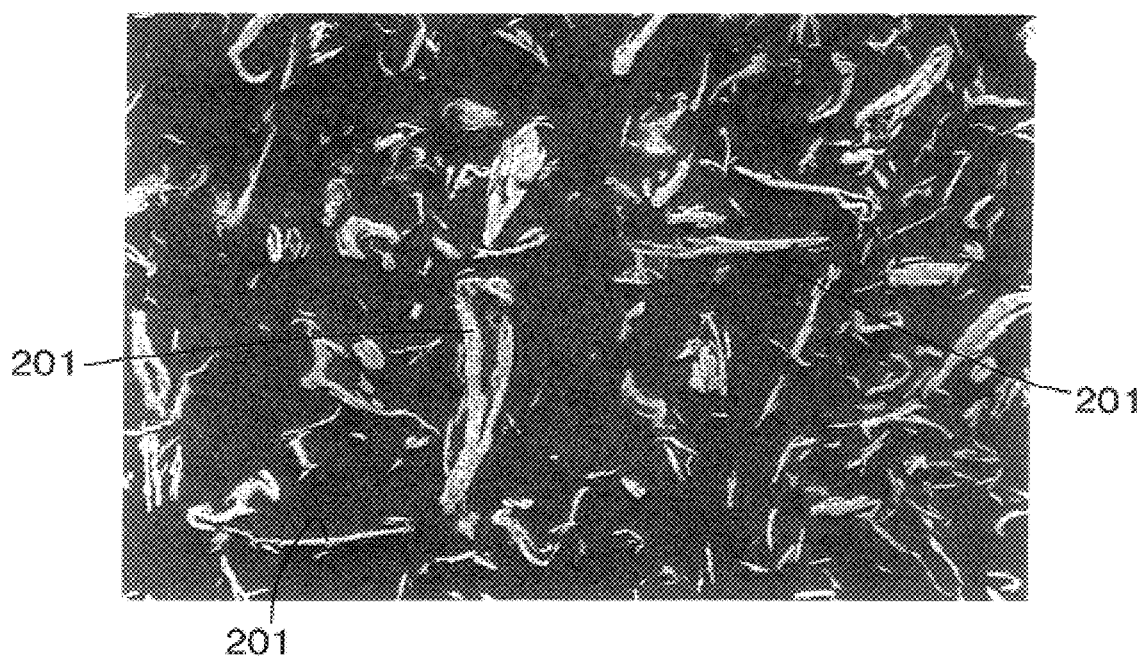
FIG. 1 is a photograph at 1000 x(original magnification) of elongate particles of flexible graphite sheet.

Graphite is a crystalline form of carbon comprising atoms covalently bonded in flat layered planes with weaker bonds between the planes. By treating particles of graphite, such as natural graphite flake, with an intercalant of, e.g. a solution of sulfuric and nitric acid, the crystal structure of the graphite reacts to form a compound of graphite and the intercalant. The treated particles of graphite are hereafter referred to as "particles of intercalated graphite." Upon exposure to high temperature, the intercalant within the graphite decomposes and volatilizes, causing the particles of intercalated graphite to expand in dimension as much as about 80 or more times its original volume in an accordion-like fashion in the "c" direction, i.e. in the direction perpendicular to the crystalline planes of the graphite. The exfoliated graphite particles are vermiform in appearance, and are therefore commonly referred to as worms. The worms may be compressed together into flexible sheets that, unlike the original graphite flakes, can be formed and cut into various shapes and provided with small transverse openings by deforming mechanical impact.

Graphite starting materials suitable for use in the present invention include highly graphitic carbonaceous materials capable of intercalating organic and inorganic acids as well as halogens and then expanding when exposed to heat. These highly graphitic carbonaceous materials most preferably have a degree of graphitization of about 1.0. As used in this disclosure, the term "degree of graphitization" refers to the value g according to the formula:

$$g = \frac{3.45 - d(002)}{0.095}$$

where d(002) is the spacing between the graphitic layers of the carbons in the crystal structure measured in Angstrom units. The spacing d between graphite layers is measured by standard X-ray diffraction techniques. The positions of diffraction peaks corresponding to the (002), (004) and (006) Miller Indices are measured, and standard least-squares techniques are employed to derive spacing which minimizes the total error for all of these peaks. Examples of highly graphitic carbonaceous materials include natural graphites from various sources, as well as other carbonaceous materials such as carbons prepared by chemical vapor deposition and the like. Natural graphite is most preferred.

The graphite starting materials used in the present invention may contain non-carbon components so long as the crystal structure of the starting materials maintains the required degree of graphitization and they are capable of exfoliation. Generally, any carbon-containing material, the crystal structure of which possesses the required degree of graphitization and which can be chemically treated and exfoliated, is suitable for use with the present invention. Such graphite preferably has an ash content of less than six weight percent. More preferably, the graphite employed for the present invention will have a purity of at least about 99%. In the most preferred embodiment, the graphite employed will have a purity of at least about 99.9%.

A common method for manufacturing graphite sheet is described by Shane et al. in U.S. Pat. No. 3,404,061, the disclosure of which is incorporated herein by reference. In the typical practice of the Shane et al. method, natural graphite flakes are intercalated by dispersing the flakes in a solution containing e.g., a mixture of nitric and sulfuric acid, advantageously at a level of about 20 to about 300 parts by weight of intercalant solution per 100 parts by weight of graphite flakes (pph). The intercalation solution contains oxidizing and other intercalating agents known in the art. Examples include those containing oxidizing agents and oxidizing mixtures, such as solutions containing nitric acid, potassium chlorate, chromic acid, potassium permanganate, potassium chromate, potassium dichromate, perchloric acid, and the like, or mixtures, such as for example, concentrated nitric acid and chlorate, chromic acid and phosphoric acid, sulfuric acid and nitric acid, or mixtures of a strong organic acid, e.g. trifluoroacetic acid, and a strong oxidizing agent soluble in the organic acid. Alternatively, an electric potential can be used to bring about oxidation of the graphite. Chemical species that can be introduced into the graphite crystal using electrolytic oxidation include sulfuric acid as well as other acids.

In a preferred embodiment, the intercalating agent is a solution of a mixture of sulfuric acid, or sulfuric acid and phosphoric acid, and an oxidizing agent, i.e. nitric acid, perchloric acid, chromic acid, potassium permanganate, hydrogen peroxide, iodic or periodic acids, or the like. Although less preferred, the intercalation solution may contain metal halides such as ferric chloride, and ferric chloride mixed with sulfuric acid, or a halide, such as bromine as a solution of bromine and sulfuric acid or bromine in an organic solvent.

The quantity of intercalation solution may range from about 20 to about 150 pph and more typically about 50 to about 120 pph. After the flakes are intercalated, any excess solution is drained from the flakes and the flakes are water-washed. Alternatively, the quantity of the intercalation solution may be limited to between about 10 and about 50 pph, which permits the washing step to be eliminated as taught and described in U.S. Pat. No. 4,895,713, the disclosure of which is also herein incorporated by reference.

The particles of graphite flake treated with intercalation solution can optionally be contacted, e.g. by blending, with a reducing organic agent selected from alcohols, sugars, aldehydes and esters which are reactive with the surface film of oxidizing intercalating solution at temperatures in the range of about 25° C. to about 125° C. Suitable specific organic agents include hexadecanol, octadecanol, 1-octanol, 2-octanol, decylalcohol, 1, 10 decanediol, decylaldehyde, 1-propanol, 1,3 propanediol, ethyleneglycol, polypropylene glycol, dextrose, fructose, lactose, sucrose, potato starch, ethylene glycol monostearate, diethylene glycol dibenzoate, propylene glycol monostearate, glycerol monostearate, dimethyl oxylate, diethyl oxylate, methyl formate, ethyl formate, ascorbic acid and lignin-derived compounds, such as sodium lignosulfate. The amount of organic reducing agent is suitably from about 0.5 to 4% by weight of the particles of graphite flake.

The use of an expansion aid applied prior to, during or immediately after intercalation can also provide improvements. Among these improvements can be reduced exfoliation temperature and increased expanded volume (also referred to as "worm volume"). An expansion aid in this context will advantageously be an organic material sufficiently soluble in the intercalation solution to achieve an improvement in expansion. More narrowly, organic materials of this type that contain carbon, hydrogen and oxygen, preferably exclusively, may be employed. Carboxylic acids have been found especially effective. A suitable carboxylic acid useful as the expansion aid can be selected from aromatic, aliphatic or cycloaliphatic, straight chain or branched chain, saturated and unsaturated monocarboxylic acids, dicarboxylic acids and polycarboxylic acids which have at least 1 carbon atom, and preferably up to about 15 carbon atoms, which is soluble in the intercalation solution in amounts effective to provide a measurable improvement of one or more aspects of exfoliation. Suitable organic solvents can be employed to improve solubility of an organic expansion aid in the intercalation solution.

Representative examples of saturated aliphatic carboxylic acids are acids such as those of the formula $H(CH_2)_n COOH$ wherein n is a number of from 0 to about 5, including formic, acetic, propionic, butyric, pentanoic, hexanoic, and the like. In place of the carboxylic acids, the anhydrides or reactive carboxylic acid derivatives such as alkyl esters can also be employed. Representative of alkyl esters are methyl formate and ethyl formate. Sulfuric acid, nitric acid and other known aqueous intercalants have the ability to decompose formic acid, ultimately to water and carbon dioxide. Because of this, formic acid and other sensitive expansion aids are advantageously contacted with the graphite flake prior to immersion of the flake in aqueous intercalant. Representative of dicarboxylic acids are aliphatic dicarboxylic acids having 2–12 carbon atoms, in particular oxalic acid, fumaric acid, malonic acid, maleic acid, succinic acid, glutaric acid, adipic acid, 1,5-pentanedicarboxylic acid, 1,6-hexanedicarboxylic acid, 1,10-decanedicarboxylic acid, cyclohexane-1,4-dicarboxylic acid and aromatic dicarboxylic acids such as phthalic acid or terephthalic acid. Representative of alkyl esters are dimethyl oxylate and diethyl oxylate. Representative of cycloaliphatic acids is cyclohexane carboxylic acid and of aromatic carboxylic acids are benzoic acid, naphthoic acid, anthranilic acid, p-aminobenzoic acid, salicylic acid, o-, m- and p-tolyl acids, methoxy and ethoxybenzoic acids, acetoacetamidobenzoic acids and, acetamidobenzoic acids, phenylacetic acid and naphthoic acids. Representative of hydroxy aromatic acids are hydroxybenzoic acid, 3-hydroxy-1-naphthoic acid, 3-hydroxy-2-naphthoic acid, 4-hydroxy-2-naphthoic acid, 5-hydroxy-1-naphthoic acid, 5-hydroxy-2-naphthoic acid, 6-hydroxy-2-naphthoic acid and 7-hydroxy-2-naphthoic acid. Prominent among the polycarboxylic acids is citric acid.

The intercalation solution will be aqueous and will preferably contain an amount of expansion aid of from about 1 to 10%, the amount being effective to enhance exfoliation. In the embodiment wherein the expansion aid is contacted with the graphite flake prior to or after immersing in the aqueous intercalation solution, the expansion aid can be admixed with the graphite by suitable means, such as a V-blender, typically in an amount of from about 0.2% to about 10% by weight of the graphite flake.

After intercalating the graphite flake, and following the blending of the intercalant coated intercalated graphite flake with the organic reducing agent, the blend is exposed to temperatures in the range of 25° to 125° C. to promote reaction of the reducing agent and intercalant coating. The heating period is up to about 20 hours, with shorter heating periods, e.g., at least about 10 minutes, for higher temperatures in the above-noted range. Times of one half hour or less, e.g., on the order of 10 to 25 minutes, can be employed at the higher temperatures.

The thus treated particles of graphite are sometimes referred to as "particles of intercalated graphite." Upon exposure to high temperature, e.g. temperatures of at least about 160° C. and especially about 700° C. to 1000° C. and higher, the particles of intercalated graphite expand as much as about 80 to 1000 or more times their original volume in an accordion-like fashion in the c-direction, i.e. in the direction perpendicular to the crystalline planes of the constituent graphite particles. The expanded, i.e. exfoliated, graphite particles are vermiform in appearance, and are therefore commonly referred to as worms. The worms may be compressed together into flexible sheets that, unlike the original graphite flakes, can be formed and cut into various shapes and provided with small transverse openings by deforming mechanical impact as hereinafter described.

Flexible graphite sheet material is coherent, with good handling strength, and is suitably compressed, e.g. by roll-pressing, to a thickness of about 0.075 mm to 3.75 mm and a typical density of about 0.08 to 2.0 grams per cubic centimeter (g/cc). From about 1.5–30% by weight of ceramic additives can be blended with the intercalated graphite flakes as described in U.S. Pat. No. 5,902,762 (which is incorporated here to provide enhanced resin impregnation in the final flexible graphite product. The additives include ceramic fiber particles having a length of about 0.15 to 1.5 millimeters. The width of the particles is suitably from about 0.04 to 0.004 mm. The ceramic fiber particles are non-reactive and non-adhering to graphite and are stable at temperatures up to about 1100° C., preferably about 1400° C. or higher. Suitable ceramic fiber particles are formed of macerated quartz glass fibers, carbon and graphite fibers, zirconia, boron nitride, silicon carbide and magnesia fibers, naturally occurring mineral fibers such as calcium metasilicate fibers, calcium aluminum silicate fibers, aluminum oxide fibers and the like.

The flexible graphite sheet can also, at times, be advantageously treated with resin and the absorbed resin, after curing, enhances the moisture resistance and handling strength, i.e. stiffness, of the flexible graphite sheet. Suitable resin content is preferably about 20 to 30% by weight, suitably up to about 60% by weight.

Flexible graphite sheet material can be provided with channels, which are preferably smooth-sided, and which pass between the parallel, opposed surfaces of the flexible graphite sheet and are separated by walls of compressed expandable graphite. When the flexible graphite sheet functions as an electrode in an electrochemical fuel cell, and is placed so as to abut the ion exchange membrane, it is the "tops" of the walls of the flexible graphite sheet that actually abut the ion exchange membrane.

The channels preferably have openings on one of the opposed surfaces that are larger than the openings in the other opposed surface. The channels can have different configurations, which can be formed, for instance, using flat-ended protrusion elements of different shapes. The smooth flat-ends of the protrusion elements preferably ensure deformation and complete displacement of graphite within the flexible graphite sheet, i.e. there are no rough or ragged edges or debris resulting from the channel-forming impact. Preferred protrusion elements have decreasing cross-section in the direction away from the pressing force to provide larger channel openings on the side of the sheet that is initially impacted. The development of smooth, unobstructed surfaces surrounding channel openings enables the free flow of fluid into and through smooth-sided channels. In a preferred embodiment, openings one of the opposed surfaces are larger than the channel openings in the other opposed surface, e.g. from 1 to 200 times greater in area, and result from the use of protrusion elements having converging sides.

The channels are formed in the flexible graphite sheet at a plurality of locations by mechanical impact. Thus, a pattern of channels is formed in the flexible graphite sheet. That pattern can be devised in order to control, optimize or maximize fluid flow through the channels, as desired. For instance, the pattern formed in the flexible graphite sheet can be uniform about the sheet (i.e., the channels are relatively evenly distributed on the sheet) or it can comprise selective placement of the channels, as described, or it can comprise variations in channel density or channel shape in order to, for instance, equalize fluid pressure along the surface of the electrode when in use, as well as for other purposes which would be apparent to the skilled artisan.

As noted above, the inventive membrane electrode assembly comprises an ion exchange membrane sandwiched between two electrodes, at least one of which is the above-described graphite sheet. A typical substrate for the ion (or proton) exchange membrane is a porous material, such as a glass cloth or a polymeric material such as a porous polyolefin like polyethylene or polypropylene. Preferably, for use in a commercial practical electrochemical fuel cell, the substrate for the PEM should be between about 10 and 200 microns thick, with an average pore diameter of about 0.1 to about 1.0 microns and porosity of about 50 to 98%. Perfluorinated polymers, like polytetrafluoroethylene, are sometimes preferred. The substrate can then be impregnated to control properties such as porosity. Styrene impregnants such as trifluorostyrene and substituted trifluorostyrenes have been suggested as particularly suitable for use in fuel cell proton exchange membranes. One preferred impregnant useful in the practice of the invention is available from Ion Power Inc. under the tradename Liquione-1100; an especially preferred impregnant is a perfluorinated polymer membrane sold under the tradename Nafion® by DuPont Company.

Suitable materials for use as the proton exchange membrane are described in U.S. Pat. Nos. 5,773,480 and 5,834,523, the disclosures of each of which are incorporated herein by reference.

In order to facilitate and/or enable the dissociation/association reactions required for fuel cell operation, a catalyst metal is typically loaded on the two opposed major surfaces of the PEM, although sometimes the catalyst metal is loaded on the electrodes abutting the PEM. Most commonly, the catalyst is a noble metal like platinum or a platinum group metal, including ruthenium, osmium, rhodium, iridium, and palladium. Although the catalyst can be loaded directly to the surface of the PEM or electrode, in the practice of the present invention, a catalyst-loaded moiety, comprising catalyst loaded on a catalyst support material, is bonded to either surface of the PEM or at least one of the electrodes.

In operation, the reaction catalyzed by the catalyst metal, that is, the dissociation of hydrogen molecules and atoms into constituent protons and electrons, and the re-association of the protons and electrons, in combination with oxygen, into water, occurs at the point where the surfaces of the electrode are in electrical contact with the ion exchange membrane and where that electrode/membrane junction on the anode side is accessible by fuel (i.e., hydrogen) and at the cathode side accessible by the oxidant (i.e., oxygen) and able to expel the water produced by the reaction. It is at this location and, effectively, only at this location, where dissociated electrons can be conducted along the electrode and dissociated protons can migrate across the membrane. Likewise, it is at the corresponding location on the cathodic side of the fuel cell where the dissociated electrons can combine with oxygen and dissociated protons that have migrated across the membrane for form water.

As noted, flexible graphite sheet material, such as foil or mat, is coherent, with good handling strength, and is suitably compressed, e.g. by roll-pressing, to a thickness of about 0.075 mm to 3.75 mm and a density of about 0.08 to 2.0 grams per cubic centimeter. The sheet can then be milled into coherent particles, advantageously from about 2 to about 50 microns in length. Alternatively, rather than pressing the expanded graphite particles (or worms) into graphite sheet, the particles can simply be oriented by compression using, e.g., opposed converging belts, to form a graphite pad having a thickness of no more than about 25 mm, and then milled as described.

The resulting particles are electrically anisotropic and capable of functioning as a catalyst support material in a fuel cell, especially a PEM fuel cell. A catalyst such as platinum or a platinum group metal is supported on the elongate, electrically anisotropic particles, rather than carbon particles or carbon paper. The particles are then positioned adjacent at least a portion of an opposed surface of the ion exchange membrane which abuts an electrode. In this way, the catalyst-loaded particles can extend (and thus make an electrical connection) between the ion exchange membrane and the electrode at positions on the walls of the electrode removed from where the walls abut the membrane, potentially increasing catalyst usage and efficiency (and, thus, fuel cell performance), because the effective area over which the reaction can occur is increased

DETAILED DESCRIPTION OF THE PREFERRED EMBODIMENTS

Figure 4:
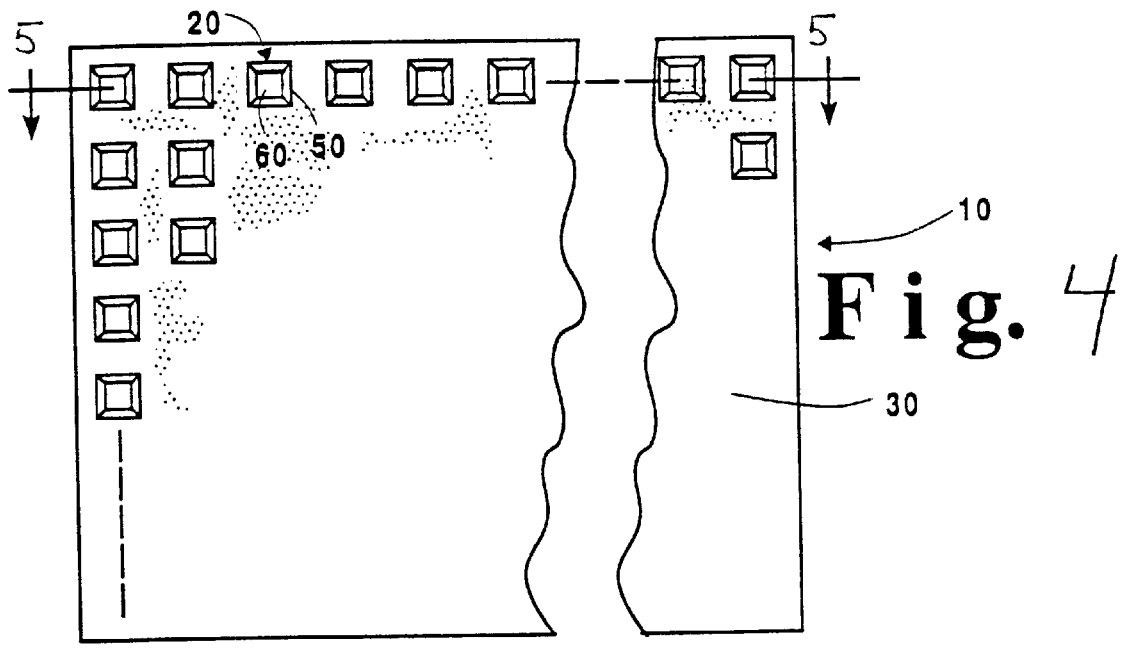
FIG. 4 is a plan view of a transversely permeable sheet of flexible graphite having transverse channels in accordance with the present invention.
Figure 4A:
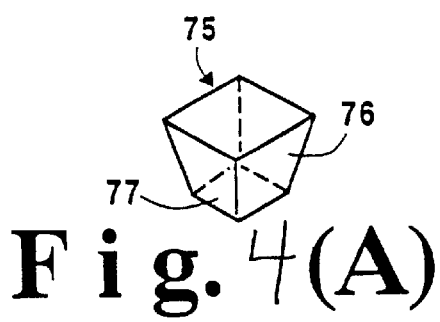
FIG. 4(A) shows a flat-ended protrusion element used in making the channels in the perforated sheet of FIG. 4.
Figure 5:
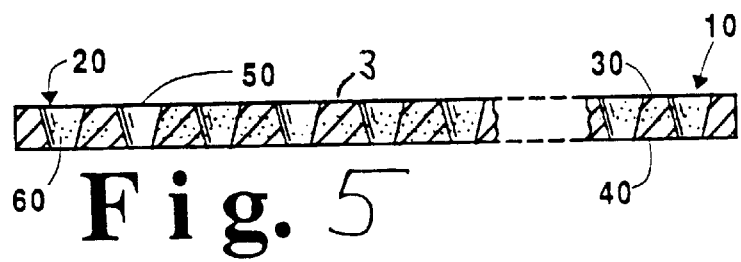
FIG. 5 is a side elevation view in section of the sheet of FIG. 4.

With reference to FIG. 4 and FIG. 5, a compressed mass of expanded graphite particles, in the form of a flexible graphite sheet is shown at 10. The flexible graphite sheet 10 is provided with channels 20, which are preferably smooth-sided, and which pass between the opposed surfaces 30, 40 of flexible graphite sheet 10, and are separated by walls 3 of compressed expandable graphite. The channels 20 preferably have openings 50 on one of the opposed surfaces 30 which are larger than the openings 60 in the other opposed surface 40. The channels 20 can have different configurations, which are formed, for instance, using flat-ended protrusion elements of different shapes, an example of which is shown at 75 in FIG. 4(A), suitably formed of metal, e.g. steel and integral with and extending from a pressing roller. The smooth flat-ends of the protrusion elements and the smooth bearing surface of the roller (or a flat bearing surface), ensure deformation and displacement of graphite within the flexible graphite sheet, i.e. there are no rough or ragged edges or debris resulting from the channel-forming impact. Preferred protrusion elements have decreasing cross-section in the direction away from the pressing roller to provide larger channel openings on the side of the sheet that is initially impacted. The development of smooth, unobstructed surfaces surrounding channel openings 60, enables the free flow of fluid into and through smooth-sided channels 20.

Openings in one of the opposed surfaces are, advantageously, larger than the channel openings in the other opposed surface, e.g. from 1 to 200 times greater in area, and result from the use of protrusion elements having converging sides. The channels 20 can be formed in the flexible graphite sheet 10 at a plurality of predetermined locations by mechanical impact at the predetermined locations in sheet 10 using a mechanism comprising a pair of steel rollers with one of the rollers having truncated, i.e. flat-ended, prism-shaped protrusions 75 which impact surface 30 of flexible graphite sheet 10 to displace graphite and penetrate sheet 10 to form open channels 20.

Figure 2:
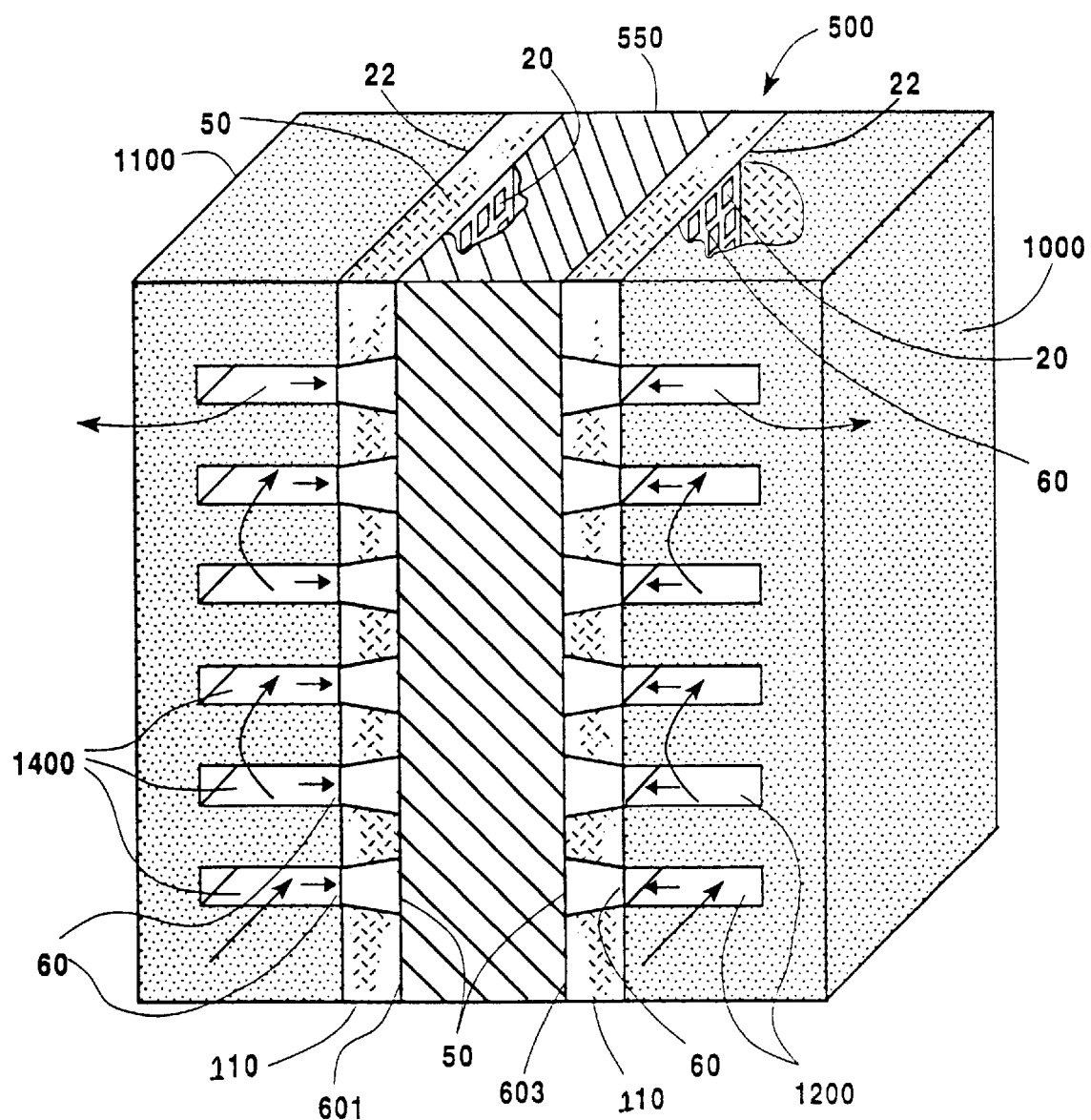
FIGS. 2, 3 and 3(A) show a fluid permeable electrode assembly in accordance with the present invention.
Figure 3:
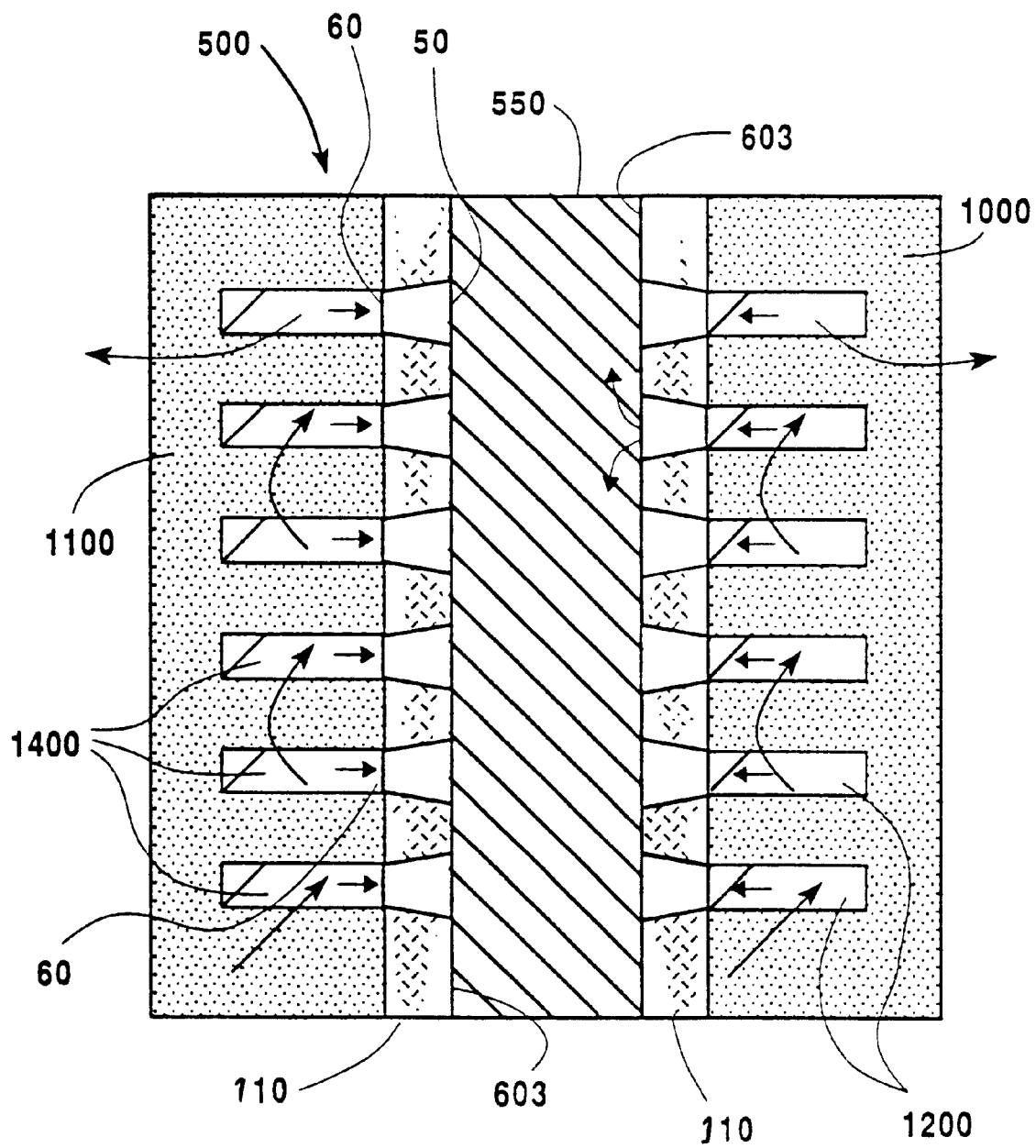
Figure 3A:
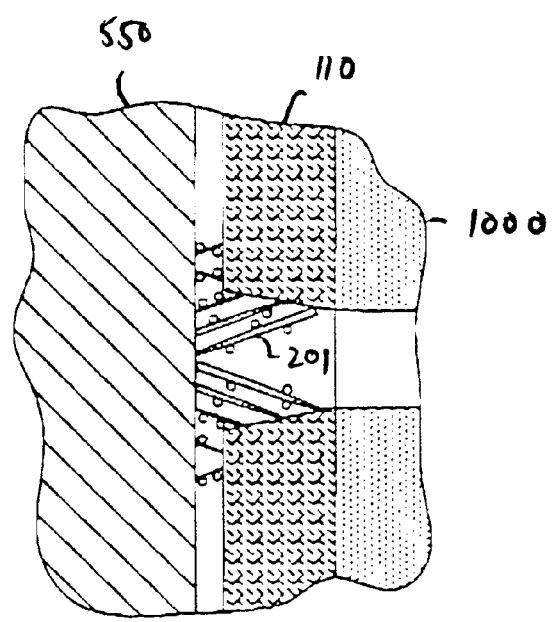

FIG. 2, FIG. 3 and FIG. 3(A) show, schematically, the basic elements of an electrochemical Fuel Cell, more complete details of which are disclosed in U.S. Pat. Nos. 4,988,583 and 5,300,370 and PCT WO Ser. No. 95/16287 (Jun. 15, 1995) and each of which is incorporated herein by reference.

With reference to FIG. 2, FIG. 3 and FIG. 3(A), the Fuel Cell indicated generally at 500, comprises electrolyte in the form of a plastic e.g. a solid polymer ion exchange membrane 550; perforated flexible graphite sheet electrodes 110 in accordance with the present invention; and flow field plates 1000, 1100 which respectively abut electrodes 110. Pressurized fuel is circulated through grooves 1400 of fuel flow field plate 1100 and pressurized oxidant is circulated through grooves 1200. The above described electrochemical fuel cell is combined with others in a fuel cell stack to provide the desired level of voltage as described in the above-noted U.S. Pat. No. 5,300,370.

The operation of Fuel Cell 500 requires that the electrodes 110 be porous to the fuel and oxidant fluids, e.g. hydrogen and oxygen, to permit these components to readily pass from the grooves 1400, 1200 through electrodes 110 to contact the catalyst 600, as shown in FIG. 3(A), and enable protons derived from hydrogen to migrate through ion exchange membrane 550. In the electrode 110, channels 20 are positioned to adjacently cover grooves 1400, 1200 of the flow field plates so that the pressurized gas from the grooves passes through the smaller openings 60 of channels 20 and exits the larger openings 50 of channels 20. The initial velocity of the gas at the smaller openings 60 is higher than the gas flow at the larger openings 50 with the result that the gas is slowed down when it contacts the catalyst 600 and the residence time of gas-catalyst contact is increased and the area of gas exposure at the membrane 550 is maximized. Of course, it will be recognized that there are situations where it may be desirable to orient electrode 10 such that pressurized gas from the grooves 1400 or 1200 of the flow field plates 1000, 1100 passes through the larger opening 50 of channels 20 and exits through the smaller openings 60 of channels 20.

A layer of elongate electrically anisotropic particles 201 milled from flexible graphite sheet, are coated or loaded with catalyst, e.g. platinum. The layer of graphite particles 201 can then be disposed on either the membrane of the fuel cell or on the electrode. Either way, graphite particles 201 are disposed so as to extend between walls 3 (both at or near where walls 3 abut the membrane, and at a location removed therefrom) and the membrane to thus form an electrical connection between the fuel cell electrode and its membrane in locations not otherwise possible, maximizing the utilization of the reacting surface of the membrane and thus the output of the fuel cell. Since the catalyst is loaded generally only where the reaction can occur, the need for catalyst is minimized and the maximum cost/benefit is accrued.

FIG. 1 shows at 201 elongate particles of flexible graphite sheet mostly less than 30 microns long. The individual particles 201 extend generally along their length in the "a" direction and are electrically anisotropic and the electrical conductivity in the "a" direction is about 500 to 5000 times greater than in the transverse "c" direction. A typical value of resistivity in the "a" direction is about 3–10 micro ohm-meters. The particles 201 can thus efficiently conduct elections along their length and enhance fuel cell efficiency.

Particles 201, such as shown in FIG. 1, are suitably formed by shredding anisotropic flexible graphite sheet or mat into strips in a suitable device, such as a hammer mill similar to that described in Perry's Chemical Engineers' Handbook, 4$^{th}$ Edition, McGraw-Hill Book Company; the strips also can be jet milled, such as in a Fluid Energy ALJET sold by ALJET, Plumsteadville, Pa. Other devices that can be used to shred the graphite sheet, such as ball mills, will be familiar to the skilled artisan.

The above description is intended to enable the person skilled in the art to practice the invention. It is not intended to detail all of the possible variations and modifications that will become apparent to the skilled worker upon reading the description. It is intended, however, that all such modifications and variations be included within the scope of the invention that is defined by the following claims. The claims are intended to cover the indicated elements and steps in any arrangement or sequence that is effective to meet the objectives intended for the invention, unless the context specifically indicates the contrary.

What is claimed is:

1. A membrane electrode assembly comprising:
   (a) a pair of electrodes, at least one of the electrodes being formed of a sheet of a compressed mass of expanded graphite particles having a plurality of transverse fluid channels passing through the sheet between first and second opposed surfaces of the sheet, the channels being separated by walls of compressed expandable graphite;
   (b) an ion exchange membrane having opposed surfaces positioned between the electrodes such that the walls formed on one of the opposed surfaces of the at least one electrode abuts the ion exchange membrane; and
   (c) a catalyst material disposed such that at least a portion of an opposed surface of the ion exchange membrane is adjacent the catalyst, wherein, the catalyst is supported on a catalyst support material which comprises elongate electrically anisotropic particles of expanded graphite, the particles of expanded graphite being from about 2 to about 50 microns in length.

2. The membrane electrode assembly of claim 1 where the catalyst material is supported on the particles of flexible graphite sheet at or near the location where the walls of the channels abut the ion exchange membrane.

3. The membrane electrode assembly of claim 1, wherein the electrical resistivity of the particles along the length of the particles is lower than the electrical resistivity transverse to the length of the particles.

4. A method for preparing a catalyst support material, which comprises:
   (a) compacting expanded graphite particles under a load to form an anisotropic, oriented sheet or pad having a thickness of no more than about 25 mm; and
   (b) forming elongate electrically anisotropic particles of expanded graphite from the sheet or mat;
   wherein the elongate electrically anisotropic particles of expanded graphite are from about 2 to about 50 microns in length.

5. The method of claim 4, wherein the sheet or mat is formed into elongate electrically anisotropic particles of expanded graphite by milling of the sheet or pad.

* * * * *